United States Patent
Goldman (10) Patent No.: US 9,949,122 B2
(45) Date of Patent: Apr. 17, 2018

(54) CHALLENGE-RESPONSE-TEST IMAGE TO PHONE FOR SECURE PAIRING

(71) Applicant: GN Audio A/S, Ballerup (DK)

(72) Inventor: Tomasz Goldman, Ballerup (DK)

(73) Assignee: GN Audio A/S (DK)

( * ) Notice: Subject to any disclaimer, the term of this patent is extended or adjusted under 35 U.S.C. 154(b) by 0 days.

(21) Appl. No.: 15/334,343

(22) Filed: Oct. 26, 2016

(65) Prior Publication Data

US 2017/0134950 A1    May 11, 2017

(30) Foreign Application Priority Data

Oct. 26, 2015  (EP) ..................................... 15191468

(51) Int. Cl.
| | |
|---|---|
| *H04W 12/06* | (2009.01) |
| *H04M 1/60* | (2006.01) |
| *H04W 4/00* | (2018.01) |
| *H04W 12/04* | (2009.01) |
| *H04W 76/02* | (2009.01) |
| *G06F 21/44* | (2013.01) |
| *H04L 29/06* | (2006.01) |

(52) U.S. Cl.
CPC ............ *H04W 12/06* (2013.01); *G06F 21/44* (2013.01); *H04L 63/0846* (2013.01); *H04M 1/6041* (2013.01); *H04W 4/008* (2013.01); *H04W 12/04* (2013.01); *H04W 76/023* (2013.01); *G06F 2221/2133* (2013.01)

(58) Field of Classification Search
CPC ..................................................... H04W 12/06
See application file for complete search history.

(56) References Cited

U.S. PATENT DOCUMENTS

| | | | |
|---|---|---|---|
| 2008/0274696 A1 | 11/2008 | Bakshi et al. | |
| 2009/0222659 A1* | 9/2009 | Miyabayashi | H04L 63/0823 713/156 |
| 2013/0205370 A1* | 8/2013 | Kalgi | H04W 12/10 726/3 |
| 2015/0042589 A1 | 2/2015 | Seo et al. | |
| 2015/0370067 A1* | 12/2015 | Denduluri | G02B 27/0101 345/8 |

OTHER PUBLICATIONS

Extended European Search Report for European patent application No. 15191468.6 dated Apr. 29, 2016.

(Continued)

*Primary Examiner* — Michael T Vu (74) *Attorney, Agent, or Firm* — Altera Law Group, LLC (57) ABSTRACT

Disclosed is a method and an audio device system comprising at least a first device for transmitting and/or receiving audio over a first protocol, where the first device is configured for securely pairing with a second device, where the first device comprises a processor configured for: —generating a random passkey comprising a number of digits; —generating an image, where the digits of the random passkey is embedded in a challenge-response test image; —transmitting the image to the second device over a second protocol; and —pairing with the second device over the first protocol, when a first criterion related to the random passkey is satisfied.

16 Claims, 6 Drawing Sheets

(56) References Cited

OTHER PUBLICATIONS

McIntire JP et al.:"A Variety of automated turing tests for network security: Using AI-hard problems in perception and cognition to ensure secure collaborations", Collaborative Technologies and Systems, 2009. CTS '09. International Symposium on, IEEE, Piscataway, NJ, USA, May 18, 20019, pp. 155-162, XP031469685, ISBN:978-1-4244-4584-4.

Alexander Gallego et al.: "Security Through Entertainment: Experiences Using a Memory Game for Secure Device Pairing", arxiv.org, Cornell Unitversity Library, 201 Olin Library Cornell University Ithaca, NY 14853, May 5, 2010, XP080476509.

\* cited by examiner

CHALLENGE-RESPONSE-TEST IMAGE TO PHONE FOR SECURE PAIRING

FIELD

The present disclosure relates to a method and audio device system comprising at least a first device, such as a headset, for transmitting and/or receiving audio over a first protocol, such as a Bluetooth protocol. The first device is configured for securely pairing with a second device, such as a smart phone.

BACKGROUND

WO14006618A1 discloses a method for authenticating a transaction between an initiator device and a transactor device over a data network, according to which a transaction request is submitted to the transactor device over the data network and an initiator determined one time parameter (OTP) is generated, based on parameters that are associated with the transaction request and with initiator activity. The initiator determined OTP is compared with a non-initiator determined OTP, both generated by means of an identical OTP engine. The transaction is denied if the initiator determined OTP and the non-initiator determined OTP are found to be different. The initiator activity is interfacing with a puzzle that is randomly selected and displayed on the initiator device, where the OTP engine generates an OTP as a function of parameters of the transaction request and of a puzzle result associated with the puzzle transmitted to the initiator device.

US2013265857 AA discloses a method of associating a first device with a second device. The first device through its speaker broadcasts a request for association using an audio signal. The broadcasted audio signal is received by the second device through its microphone. The first and second devices then cooperatively verifies a security code and upon a successful verification of the security code, the first and the second devices are enabled to communicate with each other.

U.S. Pat. No. 8,385,824 BB discloses a system for configuring and setting up a one to one communication correspondence between a headset and a mobile device. The authentication PIN allows communication of the headset with only those devices that are authenticated using the PIN. A first software application and a second software application are provided on the mobile device and a headset respectively. The process of configuring the PIN access information on the headset using the first and second application comprises the step of establishing a secure communication link by completing challenge response sequence between the headset and the device using the currently prevailing PIN, transmitting a configuration set PIN from the device to the headset, enforcing reauthentication using the newly configured PIN, and establishing and locking a communication between the device and the headset based on the new personal identification number.

The articles "Security Through Entertainment: Experiences Using a Memory Game for Secure Device Pairing" by Alexander Gallego, Nitesh Saxena, Jonathan Voris, May 2010, in arXiv:1005.0657 [cs.CR] discloses that the secure "pairing" of wireless devices based on auxiliary or out-of-band (OOB) communication, such as audio, visual, or tactile channels, is a well-established research direction. However, prior work shows that this approach to pairing can be prone to human errors of different forms that may directly or indirectly translate into man-in-the-middle attacks. To address this problem, a general direction is proposed of the use of computer games for pairing. Since games are a popular means of entertainment, the hypothesis is that they may serve as an incentive to users and make the pairing process enjoyable for them, thus improving the usability, as well as the security, of the pairing process. An emerging use case is considered of pairing whereby two different users are involved, each in possession of his or her own device (e.g., Alice and Bob pairing their smartphones for social interactions).

SUMMARY

There is a need for an improved and alternative way of securely pairing a first device, such as a Bluetooth headset, with a second device, such as a smart phone.

Disclosed is an audio device system comprising at least a first device for transmitting and/or receiving audio over a first protocol. The first device is configured for securely pairing with a second device. The first device comprises a processor configured for generating a random passkey comprising a number of digits. The processor is configured for generating an image, where the digits of the random passkey is embedded in a challenge-response test image. The processor is configured for transmitting the image to the second device over a second protocol. The processor is configured for pairing with the second device over the first protocol, when a first criterion related to the random passkey is satisfied.

According to an aspect, disclosed is a first device for transmitting and/or receiving audio over a first protocol. The first device is configured for securely pairing with a second device. The first device comprises a processor configured for generating a random passkey comprising a number of digits. The processor is configured for generating an image, where the digits of the random passkey is embedded in a challenge-response test image. The processor is configured for transmitting the image to the second device over a second protocol. The processor is configured for pairing with the second device over the first protocol, when a first criterion related to the random passkey is satisfied. The first device and the second device may be parts of an audio device system.

According to an aspect, disclosed is a method of an audio device system, where the audio device system comprises at least a first device for transmitting and/or receiving audio over a first protocol. The first device is configured for securely pairing with a second device. The method performed in the first device comprises generating a (random) passkey comprising a number of digits. The method comprises generating an image, where the digits of the random passkey are embedded in a challenge-response test image. The method comprises transmitting the image to the second device over a second protocol. The method comprises pairing with the second device over the first protocol, when a first criterion related to the random passkey is satisfied.

The method and system and device(s) as disclosed provide a solution for secure pairing between a first and second device, such as Bluetooth devices or Bluetooth enabled devices, such as between a headset and a smartphone.

It is an advantage that the random passkey is sent as a challenge-response test to the second device, such as a CAPTCHA image, since this provides better security than sending the random passkey in text format, as automated scanning, such as optical character recognition (OCR) and automated attack could be carried out easily, or more easily, in a man-in-the-middle attack, when the random passkey is in text format.

The audio device system may be a headset system, a speakerphone system etc., such as a system comprising a headset or a speakerphone and another electronic device for enabling telephone conversations.

The first device may be a headset, a speakerphone etc. which is configured for transmitting and/receiving audio over a first protocol. The audio may be sounds, such as voice or speech. The first protocol may be a Bluetooth (BT) protocol for transmitting audio, such as voice or speech from a human user of the first and second device and/or a conversational partner of the user.

The first device is configured for securely pairing with a second device. The second device may be a smart phone, a mobile phone, a cell phone, a tablet computer, a laptop, a personal computer (pc), a personal digital assistant (PDA), a smart watch, a digital wallet etc. The second device may comprise a display for displaying the challenge-response test image transmitted from the first device.

The passkey may be a random passkey or a randomly generated passkey. For security reasons it is an advantage that the passkey is random. The passkey may be valid for a limited period of time, such as a few minutes. The passkey should be random in order to be valid for a limited period of time. For security reasons it is an advantage that the passkey is only valid for a limited period of time. Thus if the passkey is random and/or only valid for limited period of time, the passkey cannot be stolen or published, and/or if the passkey is stolen or published, the passkey may not be valid for a time period long enough to be misused.

Alternatively and/or additionally, the passkey may be pre-defined, such as selected by the user, and/or the passkey may be selected from a subset or number of pre-defined passkeys, such as three passkeys, five passkeys etc. However, a passkey which is not randomly generated may not comply with security requirements.

The passkey or random passkey comprises a number of digits. Using digits in a passkey complies with the Bluetooth specification. Alternatively and/or additionally the passkey may comprises a number of symbols, characters, letter etc., such as a combination of digits, symbols, characters, letters etc. The number of digits may be six, i.e. a number between 000000 and 999999. A number of six digits is compliant with the Federal Information Processing Standard (FIPS).

The digits of the random passkey are embedded in a challenge-response test image. The challenge-response test image may be a CAPTCHA ("Completely Automated Public Turing test to tell Computers and Humans Apart") test image.

The processor is configured for transmitting the image to the second device over a second protocol. It is an advantage that transmitting or pushing, such as according to a Bluetooth profile, the image to the second device does not require a connection or completed pairing between the first and the second device, as the second protocol allows the transmission, such as Bluetooth pushing, from the first device to the second without any established connection or pairing between the two devices. Thus the transmission of the test image can be performed before, prior to or as a part of the pairing process between the devices.

The processor is configured for pairing with the second device over the first protocol, when a first criterion related to the random passkey is satisfied. The first criterion may be that the user types in the correct digits from the challenge-response test image on the second device.

When the first and the second devices are paired by means of the method, system and device(s) described above, then a secure connection is or can be established between the first device, e.g. a headset, and the second device, e.g. a smart phone, and the user of the two devices can obtain secure radio communication between the two devices, such as performing a telephone call using the smart phone, the second device, while wearing a headset or using a speakerphone, the first device, which transmits and/or receives audio signals to and from the smart phone.

The Bluetooth security model includes five distinct security features: pairing, bonding, device authentication, encryption and message integrity. Pairing is the process for creating one or more shared secret keys. Bonding is the act of storing the keys created during pairing for use in subsequent connections in order to form a trusted device pair. Device authentication is verification that the two devices have the same keys. Encryption is message confidentiality. Message integrity protects against message forgeries.

The Bluetooth security model typically uses Secure Simple Pairing, which utilizes FIPS approved algorithms and association models such as Just Works, Numeric Comparison, Passkey Entry and Out-Of-Band. FIPS is the Federal Information Processing Standard (FIPS), which is a U.S. government computer security standard used to accredit cryptographic modules.

The primary goal of Secure Simple Pairing is to simplify the pairing procedure for the user. Secondary goals are to maintain or improve the security in Bluetooth wireless technology. Secure Simple Pairing has two security goals: protection against passive eavesdropping and protection against man-in-the-middle (MITM) attacks (active eavesdropping).

Passive Eavesdropping Protection: A strong link key coupled with a strong encryption algorithm is necessary to give the user protection against passive eavesdropping. The strength of the link key is based on the amount of entropy (or randomness) in its generation process which would not be known by an attacker. Using legacy pairing, the only source of entropy is the PIN which, in many use cases, is typically four digits either selected by the user or fixed for a given product. Therefore, if the pairing procedure and one authentication exchange is recorded one can run an exhaustive search to find the PIN in a very short amount of time on commonly available computing hardware. With Secure Simple Pairing, the recording attack becomes much harder as the attacker must have solved a hard problem in public key cryptography in order to derive the link key from the recorded information. This protection is independent of the length of the passkey or other numeric values that the user must handle. Secure Simple Pairing gives the same resistance against the recording and passive eavesdropping attacks even when the user is not required to do anything. Secure Simple Pairing uses Elliptic Curve Diffie Hellman (ECDH) public key cryptography as a means to thwart passive eavesdropping attacks. ECDH provides a very high degree of strength against passive eavesdropping attacks but it may be subject to man-in-the-middle (MITM) attacks, which however, are much harder to perform in practice than the passive eavesdropping attack.

Secure Simple Pairing uses an association model such as Just Works. The Just Works association model is primarily designed for scenarios where at least one of the devices does not have a display capable of displaying a six digit number nor does it have a keyboard capable of entering six decimal digits. An example of this model is a mobile phone and headset scenarios where the headset does not have a display.

For the present audio device system and method using a visual challenge-response test, such as a CAPTCHA, as security, passive eavesdropping is prevented, as only humans and not machines should be able to solve the test.

However, MITM attacks may still be possible using the visual challenge-response test, but requires the attacker, the man-in-the-middle, to be physically quite close to the two devices which are to be paired, due to the limited physical range according to the Bluetooth standard, being such as up to 1 meter, or up to 10 meters for typical mobile devices such as mobile phone.

In some embodiments the first criterion comprises that the digits of the random passkey have been correctly entered on the second device by a user upon displaying the image on a display on the second device, when the user has solved the challenge-response test in the image. Thus when the user has solved the challenge-response test in the image, such as determined which digits are embedded in the image, e.g. in a CAPTCHA image, showing the digits in a distorted way, the user types in the correct digits on the second device, and the pairing between the first and the second device can be performed.

In some embodiments the challenge-response test image comprises a randomly generated graphic distortion of the digits of the random passkey.

In some embodiments the randomly generated graphic distortion of the digits of the random passkey is constructed to enable only a human operator to read the graphically distorted passkey digits but to prevent a computer to read the digits. The challenge-response test image may be constructed to require the use of intellectual tasks such as invariant recognition, segmentation, and parsing to complete or enable the human operator or user to read, reproduce, unscramble or understand the passkey hidden in the challenge-response test image.

In some embodiments the challenge-response test image is a Completely Automated Public Turing test to tell Computers and Humans apart (CAPTCHA) image.

A CAPTCHA (an acronym for "Completely Automated Public Turing test to tell Computers and Humans Apart") is a type of challenge-response test used in computing to determine whether or not the user is human.

Typically a CAPTCHA requires that the user type the letters of a distorted image, sometimes with the addition of an obscured sequence of letters or digits that appears on the screen.

CAPTCHAs are by definition fully automated, requiring little human maintenance or intervention to administer. This has obvious benefits in cost and reliability. Today text-based CAPTCHAS are designed such that they require the simultaneous use of three separate abilities—invariant recognition, segmentation, and parsing—to correctly complete the task with any consistency. Invariant recognition refers to the ability to recognize the large amount of variation in the shapes of letters. There are nearly an infinite number of versions for each character that a human brain can successfully identify. The same is not true for a computer, and teaching it to recognize all those differing formations is an extremely challenging task. Segmentation, or the ability to separate one letter from another, is also made difficult in CAPTCHAs, as characters are crowded together with no white space in between. Parsing is the ability to analyse in a context which is also critical. The CAPTCHA must be understood holistically to correctly identify each character.

In some embodiments the first device is configured for data communication, such as audio transmission/reception, with the second device over the first protocol using Bluetooth technology.

Bluetooth (BT) is a wireless technology standard for exchanging data over short distances, using short-wavelength UHF radio waves in the ISM band from 2.4 to 2.485 GHz, from fixed and mobile devices, and building personal area networks (PANs). Bluetooth operates at frequencies between 2400 and 2483.5 MHz, including guard bands 2 MHz wide at the bottom end and 3.5 MHz wide at the top. This is in the globally unlicensed, but not unregulated, Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. Bluetooth 4.0 uses 2 MHz spacing, which accommodates 40 channels. The first channel starts at 2402 MHz and continues up to 2480 MHz in 1 MHz steps. It usually performs 1600 hops per second, with Adaptive Frequency-Hopping (AFH) enabled.

Bluetooth Low Energy, also called Bluetooth LE, BTLE, BLE or Bluetooth Smart technology, operates in the same spectrum range, the 2.400 GHz-2.4835 GHz ISM band, as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW.

In order to use Bluetooth technology, a device must be compatible with the subset of Bluetooth profiles necessary to use the desired services. A Bluetooth profile is a specification regarding an aspect of Bluetooth-based wireless communication between devices. It resides on top of the Bluetooth Core Specification and (optionally) additional protocols. While the profile may use certain features of the core specification, specific versions of profiles are rarely tied to specific versions of the core specification. For example, there are Hands-Free Profile (HFP) 1.5 implementations using both Bluetooth 2.0 and Bluetooth 1.2 core specifications.

The way a device uses Bluetooth technology depends on its profile capabilities. The profiles provide standards which manufacturers follow to allow devices to use Bluetooth in the intended manner.

In some embodiments transmitting the image over the second protocol is performed using an Object Exchange (OBEX) profile of the Bluetooth technology.

In some embodiments the Object Exchange (OBEX) profile uses an Object Push Profile (OPP) of the Bluetooth technology.

The Object Push Profile (OPP) is a basic profile for sending "objects" such as pictures, virtual business cards, or appointment details. It is called push because the transfers are instigated by the sender (client), not the receiver (server). OPP uses the application programming interfaces (APIs) of object exchange (OBEX) profile and the OBEX operations which are used in OPP are connect, disconnect, put, get and abort. By using these API the OPP layer will reside over OBEX and hence follow the specifications of the Bluetooth stack.

In some embodiments the first device is a headset and/or a speakerphone.

In some embodiments the second device is a smartphone, mobile phone, cell phone, tablet computer, personal computer (PC) and/or laptop computer configured to run a software application performing a Push Server function of the Bluetooth technology and configured to receive and display the challenge-response test image with the random passkey.

In some embodiments the generated random passkey comprises six digits.

The use of six digits in the random passkey allows the pairing to be FIPS compliant, which is also a bank standard. Federal Information Processing Standard (FIPS) is a U.S. government computer security standard used to accredit cryptographic modules. The six digits is thus a number between 000000 and 999999.

In some embodiments the generated random passkey is valid for a limited period of time. The random passkey may be valid up to 5 min, or up to 4 minutes, or up to 3 minutes, or up to 2 minutes or up to 1 minute, or up to 10 minutes etc. For security reasons it is an advantage that the passkey is only valid for a limited period of time. Thus if the passkey is random and/or only valid for a limited period of time, the passkey cannot be stolen or published, and/or if the passkey is stolen or published, the passkey may not be valid for a time period long enough to be misused.

In some embodiments the image is in portable network graphics (PNG) file format. The image may be in another suitable image file format. Image file formats are standardized means of organizing and storing digital images. Image files are composed of digital data in one of these formats that can be rasterized for use on a computer display or printer. An image file format may store data in uncompressed, compressed, or vector formats. Once rasterized, an image becomes a grid of pixels, each of which has a number of bits to designate its color equal to the color depth of the device displaying it. Other image file formats may include JPEG, TIFF, GIF. The image file format should be suitable for displaying on a display of the second device, e.g. on a smart phone etc. comprising a potentially small screen with a potentially low resolution.

The present invention relates to different aspects including the audio device system described above and in the following, and corresponding first devices, second devices, methods, devices, systems, networks, kits, uses and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 1:
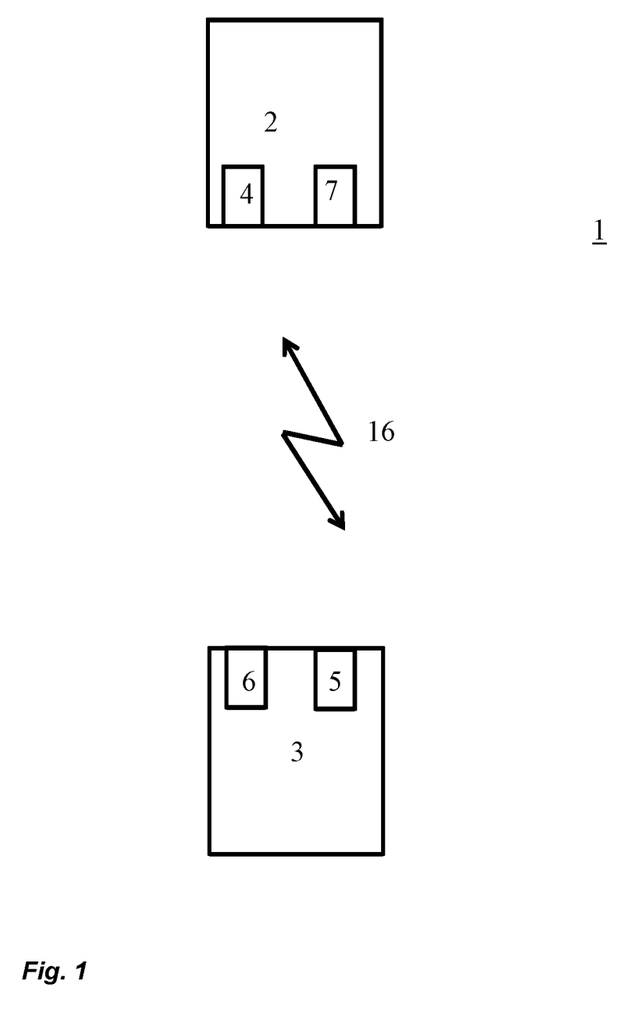
FIG. 1 schematically illustrates an example of an audio device system.

FIG. 1 schematically illustrates an example of an audio device system. The audio device system 1 comprises at least a first device 2 for transmitting and/or receiving audio over a first protocol. The first device 2 is configured for securely pairing with a second device 3. The first device 2 comprises a processor 4 configured for generating a random passkey comprising a number of digits; generating an image, where the digits of the random passkey is embedded in a challenge-response test image; transmitting the image to the second device 3 over a second protocol; and pairing with the second device 3 over the first protocol, when a first criterion related to the random passkey is satisfied.

The first device 2 and the second device 3 are configured to be connected in a wireless mode 16 by means of a first transceiver 7 in the first device 2 and a second transceiver 5 in the second device 3.

The first device 2 may be a headset, a speakerphone etc.

The first device 2 is configured for wireless data communication 16, such as audio transmission and/or reception, with the second device 3 over the first protocol using Bluetooth technology.

The second device 3 comprises a processor 6. The second device 3 may be a smartphone, mobile phone, cell phone, tablet computer, personal computer (PC) and/or laptop computer configured to run a software application performing a Push Server function of the Bluetooth technology and configured to receive and display the challenge-response test image with the random passkey.

Figure 2:
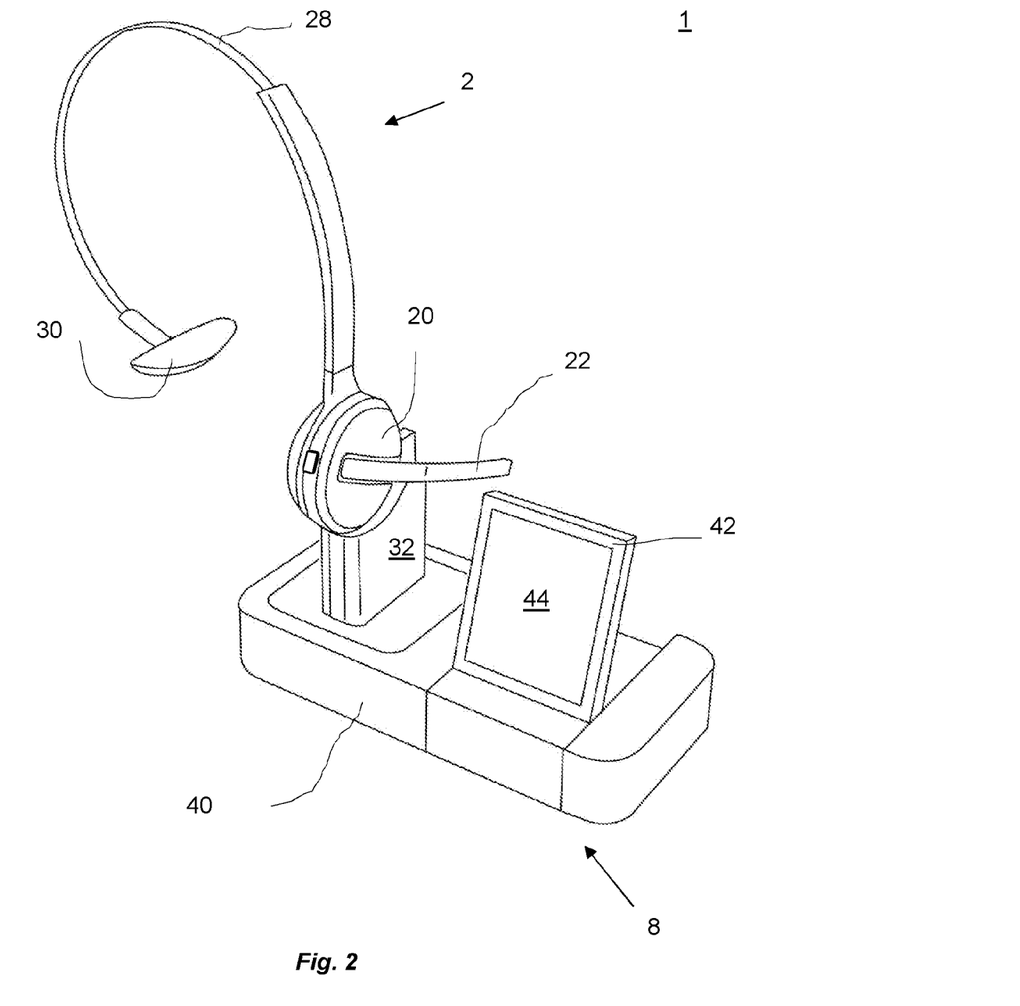
FIG. 2 schematically illustrates an example of an audio device system.

FIG. 2 schematically illustrates an example of an audio device system. The audio device system 1 comprises a first device 2. A headset base 8 is also illustrated. The first device 2 is illustrated as a headset 2 comprising an earphone 20 configured to be placed over the ear of a user such that the user can hear audio transmitted to the headset, a microphone boom 22 attached to the earphone, where the microphone boom 22 comprises one or more microphones for capturing the voice of the user, a headband 28 configured to rest on the top of the head of the user wearing the headset, and a part 30 supporting the headset to the head of the user at the ear opposite the ear where the earphone 20 is placed.

The headset base 8 comprises a bottom 40, a stand 32 for holding the headset 2 when the headset is not in use on the users head, a display 42 comprising a screen 44. The screen 44 may be configured for displaying visual messages such as text or flashing light to the user.

Figure 3:
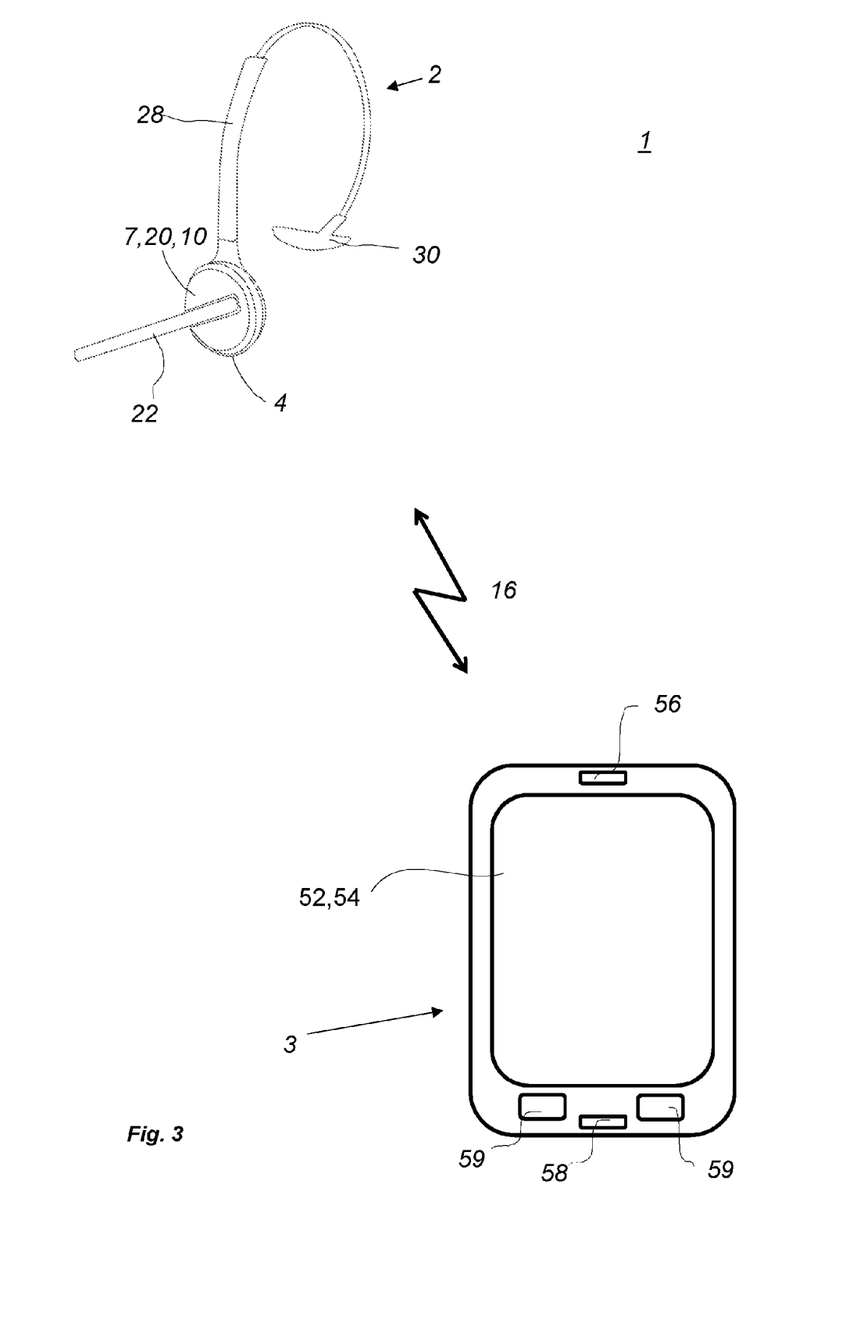
FIG. 3 schematically illustrates an example of an audio device system.

FIG. 3 schematically illustrates an example of an audio device system. The audio device system 1 comprises a first device 2. The first device 2 is configured for securely pairing with a second device 3.

The first system part 2 is illustrated as a headset 2 comprising an earphone 20 configured to be placed over the ear of a user such that the user can hear audio transmitted to the headset, a microphone boom 22 attached to the earphone, where the microphone boom 22 comprises one or more microphones for capturing the voice of the user, a headband 28 configured to rest on the top of the head of the user wearing the headset, and a part 30 supporting the headset to the head of the user at the ear opposite the ear where the earphone 20 is placed.

The second device 3 is illustrated as a smart phone 3 comprising a display 52 comprising a screen 54. The screen 54 is configured for displaying visual content to the user. The second device 3 comprises a speaker 56 for transmitting audio to the user, e.g. to the ear of the user. The second device 3 comprises a microphone 58 for receiving audio, such as speech, from the user. The second device 3 may further comprise one or more buttons 59 for controlling the second device.

The headset 2 and the smartphone 3 are configured to be connected in the wireless mode 16 by means of a first transceiver 7 in the headset and a second transceiver 5 in the smartphone.

The headset 2 and the smartphone 3 may also be configured to be connected in a corded mode (not shown) by means of a cord or wire connecting a first connector part (not shown) in the headset 2 and a second connector part (not shown) in the smartphone 3.

The wireless mode 16, e.g. shown in FIGS. 1 and 3 may be provided via a radio connection, such as a connection according to any wireless standard, such as a Bluetooth standard specifically configured for voice communication.

Figure 4:
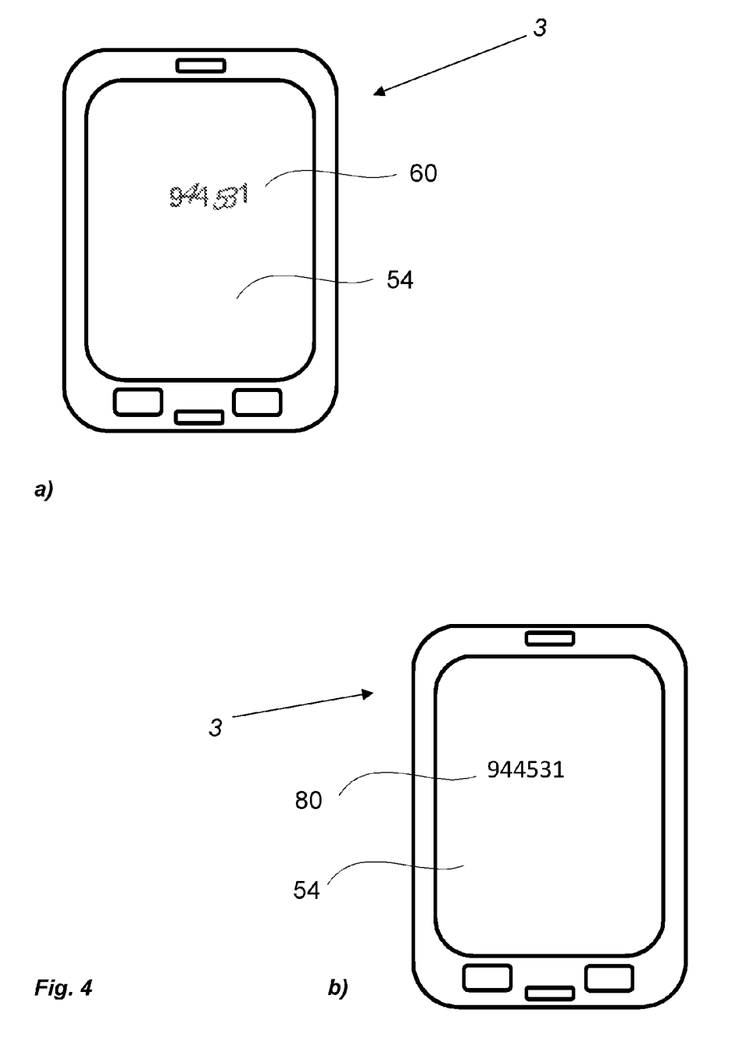
FIG. 4 schematically illustrates an example of displaying a challenge-response test image where the digits of the random passkey are embedded in the challenge-response test image.

FIG. 4 schematically illustrates an example of displaying a challenge-response test image where the digits of the random passkey are embedded in the challenge-response test image.

FIG. 4a) schematically illustrates a second device 3 displaying a challenge-response test image 60 where the digits of the random passkey are embedded in the image. The second device 3 is illustrated as a smart phone 3, and the challenge-response test image 60 is displayed on the screen 54 of the smart phone 3.

FIG. 4b) schematically illustrates that the digits of the random passkey 80 have been correctly entered on the second device 3 by the user, when the user has solved the challenge-response test in the image 60 in FIG. 1a). The user may enter the digits using a keyboard of the smart phone 3, such as a keyboard of soft keys, which emerges on the screen of the smart phone, when the smart phone receives the image 60 pushed from the first device, e.g. headset.

The challenge-response test image 60 comprises a randomly generated graphic distortion of the digits of the random passkey 80. The challenge-response test image 60 is a Completely Automated Public Turing test to tell Computers and Humans apart (CAPTCHA) image, thus the randomly generated graphic distortion of the digits of the random passkey 80 is constructed to enable only a human operator to read the graphically distorted passkey digits but to prevent a computer to read the digits. The generated random passkey 80 comprises six digits, in this case the digits 944531. The image 60 may be in portable network graphics (PNG) file format.

Figure 5:
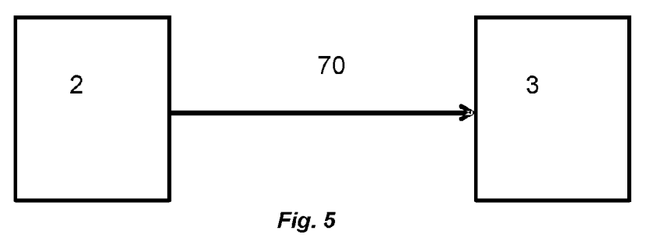
FIG. 5 schematically illustrates transmission of an image over a second protocol.

FIG. 5 schematically illustrates transmission of an image over a second protocol. Transmission of the image over the second protocol may be performed using an Object Exchange (OBEX) profile of the Bluetooth technology. The Object Exchange (OBEX) profile may use an Object Push Profile (OPP) (70) of the Bluetooth technology.

Figure 6:
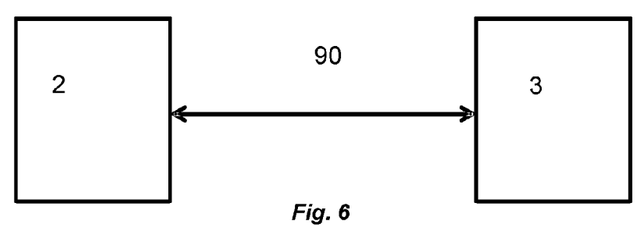
FIG. 6 schematically illustrates an example of radio communication over a first protocol, using e.g. Bluetooth technology, between a first device and a second device not exposed to a man-in-the-middle (MITM) attack.
Figure 7:
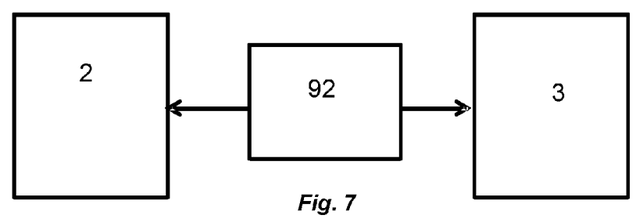
FIG. 7 schematically illustrates an example of radio communication over a first protocol, using e.g. Bluetooth technology, between a first device and a second device exposed to a man-in-the-middle (MITM) attack.

FIG. 6 and FIG. 7 schematically illustrates examples of radio communication over a first protocol, using e.g. Bluetooth technology, between a first device and a second device not exposed 90 to a man-in-the-middle (MITM) attack and exposed 92 to a man-in-the-middle attack, respectively.

In FIG. 6 undisturbed 90 radio communication over a first protocol, of e.g. Bluetooth technology, between a first device 2, such as a headset, and a second device 3, such as a smart phone, is illustrated with a uninterrupted arrow between the first device 2 and the second device 3.

In FIG. 7 the radio communication between a first device 2 and a second device 3 is exposed 92 and interrupted by a man-in-the-middle attack, whereby all radio communication is transmitted through the man-in-the-middle. By means of the present audio device system, first device and/or second device and corresponding method(s) man-in-the-middle attacks can be prevented or complicated.

Figure 8:
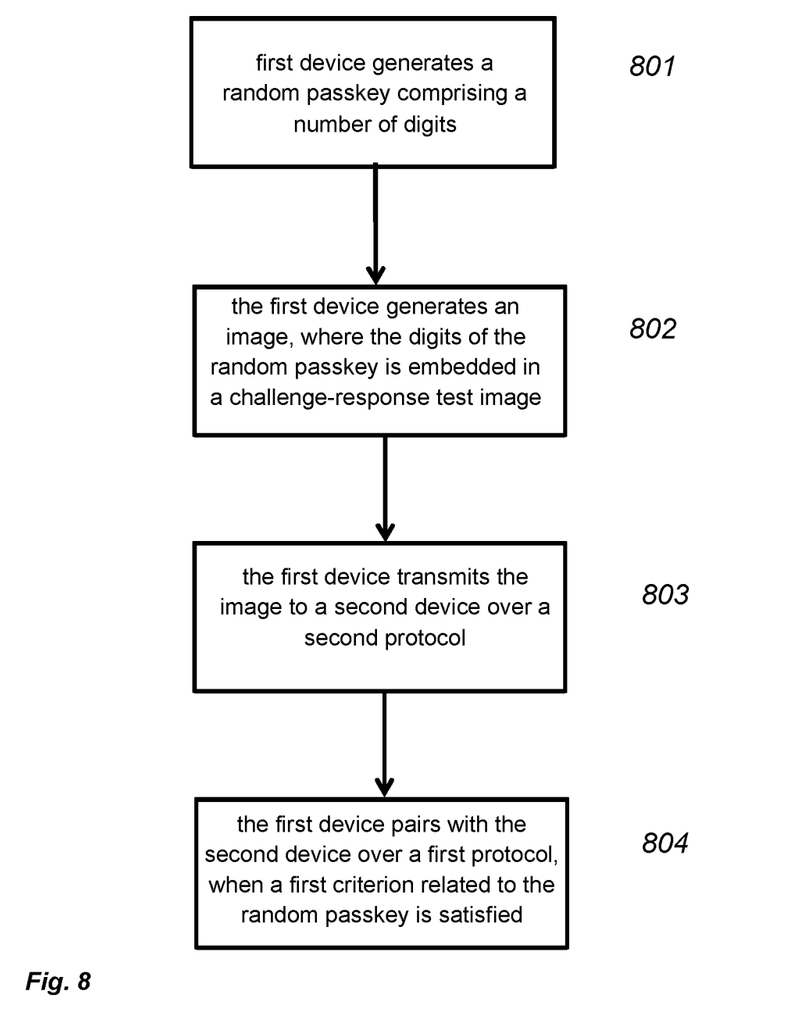
FIG. 8 schematically illustrates a method of an audio device system

FIG. 8 schematically illustrates a method of an audio device system. The audio device system comprises at least a first device for transmitting and/or receiving audio over a first protocol. The first device is configured for securely pairing with a second device.

The method performed in the first device comprises a number of steps.

In step 801 a random passkey comprising a number of digits is generated.

In step 802 an image is generated, where the digits of the random passkey is embedded in a challenge-response test image.

In step 803 the image is transmitted to the second device over a second protocol. In step 804 the first device is paired with the second device over the first protocol, when a first criterion related to the random passkey is satisfied.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 1 audio device system
2 first device
3 second device
4 processor of first device
5 second transceiver
6 processor of second device
7 first transceiver
8 headset base
16 wireless mode
20 earphone
22 microphone boom 28 headband
30 part supporting the headset to the head of the user at the ear opposite the ear where the earphone is placed.
32 stand
40 bottom of headset base
42 display of headset base
44 screen headset base
52 display of smart phone
54 screen of smart
56 speaker of smart phone
58 microphone of smart phone
59 buttons of smart phone
60 challenge-response test image
70 Object Push Profile (OPP) of the Bluetooth technology
80 digits of the random passkey
90 radio communication not exposed to a man-in-the-middle (MITM) attack
92 radio communication exposed to a man-in-the-middle attack
801 step of method where a random passkey comprising a number of digits is generated
802 step of method where an image is generated, where the digits of the random passkey is embedded in a challenge-response test image.
803 step of method where the image is transmitted to the second device over a second protocol
804 step of method where the first device is paired with the second device over the first protocol, when a first criterion related to the random passkey is satisfied

The invention claimed is:

1. An audio device system for secure pairing of wireless audio devices comprising;
   a. at least a first audio device for transmitting and receiving audio; said first device configured to at least transmit over a first protocol and to transmit and receive over a second protocol separate from said first protocol;
   b. at least one second audio device for transmitting and receiving audio; said second device configured to receive over said first protocol and to transmit and receive over said second protocol separate from said first protocol;
   c. said first audio device including a processor configured to securely pair with said second device according to the following in any sequence:
said first audio device generating a random passkey comprising a number of digits;
said first audio device generating an image, where the digits of the random passkey is embedded in a challenge-response test image;
said first audio device transmitting the image to the second device over a said second protocol; and
pairing with the second audio device over the first protocol, and when a first criterion related to the random passkey is satisfied, permitting audio communications between said and second audio devices.

2. The audio device system according to claim 1, wherein the second device includes a display; and
   the first criterion includes digits of the random passkey have been correctly entered on the second device by a user upon displaying the image on the display on the second device, when the user has solved the challenge-response test in the image.

3. The audio device system according to claim 1, wherein the challenge-response test image comprises a randomly generated graphic distortion of the digits of the random passkey.

4. The audio device system according to claim 1, wherein the randomly generated graphic distortion of the digits of the random passkey is constructed to enable only a human operator to read the graphically distorted passkey digits but to prevent a computer to read the digits.

5. The audio device system according to claim 1, wherein the challenge-response test image is a Completely Automated Public Turing test to tell Computers and Humans apart (CAPTCHA) image.

6. The audio device system according to claim 1, wherein the first device is configured for data communication, such as audio transmission/reception, with the second device over the first protocol using Bluetooth technology.

7. The audio device system according to claim 1, wherein transmitting the image over the second protocol is performed using an Object Exchange (OBEX) profile with Object Push Profile (OPP) technology, so that the image can be transmitted from the first audio device to the second even if the devices are not yet paired.

8. The audio device system according to claim 1, wherein transmitting the image over the second protocol is performed using push technology, so that the image can be transmitted from the first audio device to the second even if the devices are not yet paired.

9. The audio device system according to claim 1, wherein the first device is a headset and/or a speakerphone.

10. The audio device system according to claim 1, wherein the second device is a smartphone, mobile phone, cell phone, tablet computer, personal computer (PC) and/or laptop computer configured to run a software application performing a Push Server function of the Bluetooth technology and configured to receive and display the challenge-response test image with the random passkey.

11. The audio device system according to claim 1, wherein the generated random passkey comprises six digits.

12. The audio device system according to claim 1, wherein the generated random passkey is valid for a limited period of time; whereafter it expires and cannot be acknowledged by the second device.

13. The audio device system according to claim 1, wherein the image is in portable network graphics (PNG) file format.

14. The system of claim 1 wherein said audio communication may commence under either of the first or second protocols.

15. A method of an audio device system, the audio device system comprising at least a first device for transmitting and receiving audio over a first protocol, where the first device is configured for securely pairing with a second device, where the method performed in the first device comprises:
   configuring said second protocol to receive communications between said devices without pairing;
   configuring said first protocol to block communications between said devices until said devices are paired;
   generating a random passkey comprising a number of digits;
   generating an image, where the digits of the random passkey is embedded in a challenge-response test image;
   transmitting the image to the second device over a said second protocol;
   receiving a response from the second device over said second protocol;
   pairing with the second device over the first protocol, when a first criterion related to the random passkey is satisfied over said second protocol.

16. An audio device system for secure pairing of wireless audio devices comprising:
   a. at least a first audio device for transmitting and receiving audio; said first device configured to transmit and receive over a first protocol and to transmit and receive over a second protocol separate from said first protocol;
   b. at least one second audio device for transmitting and receiving audio; said second device configured to transmit and receive over said first protocol and to transmit and receive over said second protocol separate from said first protocol, said first protocol requiring pairing to exchange further communications and said second protocol not requiring pairing to communicate between said first and second audio devices;
   c. said first audio device including a processor configured to securely pair with said second device according to the following in any sequence:

said first audio device generating a random passkey comprising a number of digits;

said first audio device generating an image, where the digits of the random passkey is embedded in a challenge-response test image;

said first audio device transmitting the image to the second device over said second protocol; and pairing with the second audio device over the first protocol; when a first criterion related to the random passkey is satisfied, thereby permitting audio communications between said and second audio devices on either protocol.

* * * * *